June 23, 1970  A. T. NIELSEN  3,516,351
APPARATUS FOR BRIQUETTING LOOSE, FIBROUS, OR TANGLED
MATERIAL, PARTICULARLY DRIED GREEN CROPS
Filed May 27, 1968
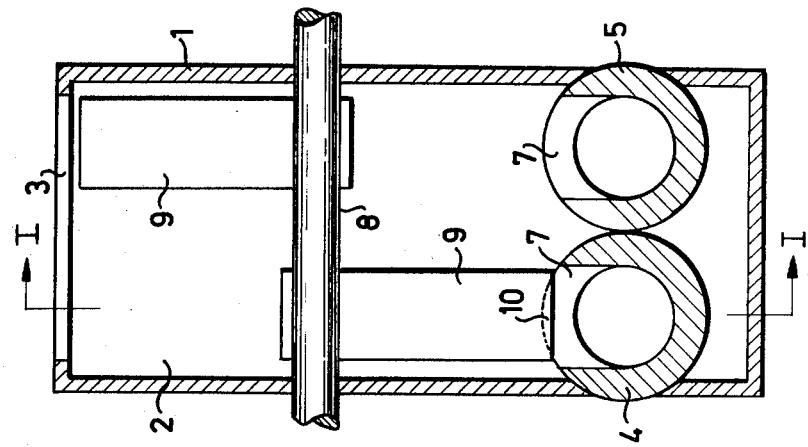
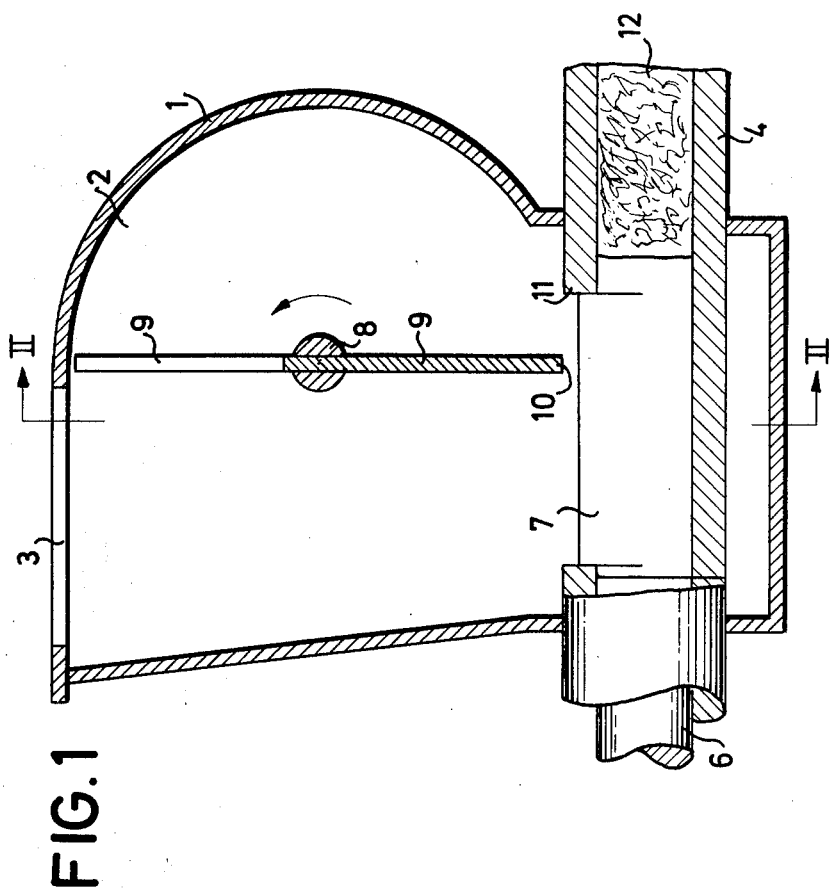

United States Patent Office 3,516,351
Patented June 23, 1970

3,516,351
APPARATUS FOR BRIQUETTING LOOSE, FIBROUS, OR TANGLED MATERIAL, PARTICULARLY DRIED GREEN CROPS
Alfred Thygesen Nielsen, Lyngbakkevej 8, Sollerod pr., Holte, Denmark
Filed May 27, 1968, Ser. No. 732,157
Claims priority, application Denmark, June 1, 1967, 2,884/67
Int. Cl. B30b 7/00
U.S. Cl. 100—139          3 Claims

ABSTRACT OF THE DISCLOSURE

The apparatus for making briquettes of dried grass or other fibrous raw material comprises at least one compression cylinder which through a lateral aperture receives a precompressed batch of material when the compression piston is near the end of its return stroke. Said aperture is open towards a precompression chamber having an inlet for the raw material and enclosing a rotary vane or baffle sweeping through the chamber and promoting the movement of the material from said inlet towards said aperture while at the same time causing the material to be precompressed without destroying its original structure.

---

The invention relates to an apparatus for briquetting loose, fibrous, or tangled material, particularly dried green crops such as grass or lucerne, and of the type comprising at least one compression cylinder with a side aperture for admitting the material into the cylinder in front of a piston operating therein.

In such devices, in which is often desired a final pressure of several hundred kilograms per square centimetre, the very voluminous nature of the raw material makes it difficult to ensure a suitable filling of the cylinder previously to the compression stroke of the piston. A comparatively simple solution consists in using a worm conveyor for the forced feeding of the raw material through the side aperture of the compression cylinder, but for the briquetting of dried grass or other comparatively crisp material this solution is unsatisfactory because the worm causes an extensive crushing or grinding of the material. Consequently, the straw structure of the latter will as regards an essential part of the material be lost to the detriment of the value of the finished briquettes as fodder, particularly for cows.

In another known briquetting press it has been attempted to avoid this drawback by a special design of the compression cylinder, the latter being composed of two semicylindrical parts which can swing in relation to each other by being turned around a hinge parallel to the axis of the cylinder. In this way the cylinder can be opened in one side for admitting a certain quantity of material, when the cylinder is reclosed this quantity of material is to some degree compressed in the direction transversely to the cylinder axis previously to the final compression by means of the piston operating in the closed cylinder. By the use of such an apparatus the straw structure of the raw material may be preserved, or substantially so, but the construction of the apparatus is complicated and will inevitably cause difficulties in the operation. Furthermore, the precompression of the material occurring at the closing of the cylinder will be of a modest value.

The apparatus according to the invention differs from the known constructions in that through its side aperture the cylinder communicates with a precompression chamber having an inlet for the loose material and comprising at least one rotary wing which sweeps through the chamber between the inlet and the aperture and under compression of the loose material promotes the travel of the latter from the inlet to the cylinder.

In spite of its simple and reliable construction such an apparatus may under a suitably gentle treatment of the raw material ensure a good precompression of the latter and thereby an effective filling of the compression cylinder proper. This is due to the direct compressing and conveying effect of the impact wing and the fact that during the compression stroke of the piston an accumulation of raw material will occur above the side aperture of the cylinder blocked by the piston, and during the return stroke this plug like material will be sucked down into the cylinder due to the vacuum produced therein.

This plug-formation may be intensified in a preferred embodiment of the apparatus, in which the rotary wing or each of the rotary wings is slightly resilient and with its outer edge sweeps closely past the front end edge in the side aperture of the cylinder. This end edge will have a braking effect on the content of material of the precompression chamber, so that the tendency of this material to merely participating in the rotary movement of the wing in the chamber is prevented. The plug over the side aperture will consequently become extra compact, and due to its resilience the rotary wing will easily slide over the plug when the wing, as is most practical, is operated at a constant velocity.

According to the invention it is preferred that the rotary movement of the wing or of each wing is so coordinated with the movement of the associated piston that the extreme edge of the wing moves from the inlet to the side aperture during the return stroke of the piston. This results in an advantageous coordination of the precompression by means of the wing and the final compression by means of the piston.

The number of compression cylinders and wings may be chosen at will, but usually it is to be preferred that there is a single wing for each cylinder.

An embodiment of the apparatus according to the invention having two cylinders and two associated wings will now be further explained with reference to the drawing in which:

FIG. 1 is a substantially diagrammatical section on line I—I in FIG. 2, and

FIG. 2 a corresponding section on line II—II in FIG. 1.

In the embodiment shown the apparatus comprises a housing 1 consisting of sheet material, the said housing at its top forming a partially cylindrical precompression chamber 2 with an upper inlet 3 for the material to be treated, and below enclosing two compression cylinders 4 and 5, each of which contains one piston 6, see FIG. 1. By means of a mechanism, not shown, the two pistons 6 are operated in counterphase, viz so that one travels forwards while the other travels backwards.

In the direction towards the precompression chamber 2 each of the cylinders 4 and 5 is provided with a side aperture 7, the width of which in the embodiment shown corresponds to the bore of the cylinder.

A shaft 8 is journalled in the side walls of the housing 1, and by means of a driving mechanism, not shown, this shaft is rotated in the direction of the arrow shown in FIG. 1. The shaft carries two wings or vanes 9 which have an angular displacement of 180° in relation to each other and cooperate with the respective one of the two cylinders 4 and 5, see FIG. 2. These wings may expediently be composed of a number of resilient steel blades and have such a length that during the rotary movement their extreme edge 10 sweeps closely past the front edge 11 in the side aperture 7 in the associated cylinder. As explained above, this promotes the plug-formation over the side aperture 7 during the downward movement of the wing from the inlet opening 3.

The final compression of the material occurs in the cylinders 4 and 5 and results in the formation of a very compact and firm plug or continuous briquette 12 as indicated in FIG. 1.

What I claim is:

1. An apparatus for briquetting dried green crops and similar loose and fibrous material, comprising a housing forming a precompression chamber, an inlet aperture in one wall of said housing for the material to be briquetted, at least one compression cylinder mounted in said housing and communicating with said chamber through a lateral aperture spaced from said inlet aperture, a piston that is reciprocable in said cylinder between an extended and a retracted position in which it covers and uncovers, respectively, said lateral aperture, a rotary shaft extending through said precompression chamber substantially midway between said inlet and lateral apertures and substantially perpendicular to the axis of said cylinder, and a wing secured to said shaft for sweeping through said chamber from said inlet aperture to said lateral aperture to thereby promote the movement of the material towards said cylinder.

2. An apparatus as claimed in claim 1 wherein said wing is a substantially flat and slightly resilient plate having an axial width corresponding to the width of said lateral aperture, and having a radially outer edge that sweeps closely past the front end edge of said lateral aperture.

3. An apparatus as claimed in claim 1 wherein the rotation of said rotary shaft is so coordinated with the reciprocation of said piston that the radially outer end of said wing moves from said inlet aperture to said lateral aperture while said piston moves from its extended to its retracted position.

References Cited

UNITED STATES PATENTS

| | | | |
|---|---|---|---|
| 496,669 | 5/1893 | Selover | 100—209 XR |
| 751,752 | 2/1904 | Pilliod | 100—185 XR |
| 884,530 | 4/1908 | Shepard | 100—209 |
| 1,038,255 | 9/1912 | Wilson. | |
| 2,966,842 | 1/1961 | Roche | 100—209 |
| 3,180,250 | 4/1965 | Johnson et al. | 100—209 XR |
| 3,352,229 | 11/1967 | Morse | 100—38 |

FOREIGN PATENTS

| | | |
|---|---|---|
| 885,461 | 9/1943 | France. |

BILLY J. WILHITE, Primary Examiner

U.S. Cl. X.R.

100—185, 209; 107—14